(12) United States Patent
Tessier et al.

(10) Patent No.: US 9,878,278 B2
(45) Date of Patent: Jan. 30, 2018

(54) METHOD OF PURIFYING HYDROGEN FROM A METAL HYDRIDE STORAGE SYSTEM

(71) Applicant: L'Air Liquide, Societe Anonyme pour l'Etude et l'Exploitation des Procedes Georges Claude, Paris (FR)

(72) Inventors: Pascal Tessier, Hockessin (DE); Philippe Coignet, Wilmington, DE (US); Benjamin Jurcik, Landenberg, PA (US); Ryan Adelman, Wilmington, DE (US)

(73) Assignee: L'AIR LIQUIDE SOCIÉTÉ ANONYME POUR L'ÉTUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 82 days.

(21) Appl. No.: 15/143,548

(22) Filed: Apr. 30, 2016

(65) Prior Publication Data
US 2017/0239610 A1  Aug. 24, 2017

Related U.S. Application Data

(60) Provisional application No. 62/298,181, filed on Feb. 22, 2016.

(51) Int. Cl.
*F17C 11/00* (2006.01)
*B01D 53/04* (2006.01)
*B01D 53/053* (2006.01)

(52) U.S. Cl.
CPC .......... *B01D 53/053* (2013.01); *F17C 11/005* (2013.01); *B01D 2253/102* (2013.01);
(Continued)

(58) Field of Classification Search
CPC .............. B01D 53/053; B01D 53/0446; B01D 53/0438; B01D 2253/102; B01D 2256/16;
(Continued)

(56) References Cited

U.S. PATENT DOCUMENTS 3,713,273 A * 1/1973 Coffee ............... B01D 53/0438
95/143
5,067,447 A * 11/1991 Iwaki ............... B60K 15/03006
123/3
(Continued)

FOREIGN PATENT DOCUMENTS

AU  2005313837  6/2006
CN  2020 48351  11/2011
(Continued)

OTHER PUBLICATIONS

3M Company; Customer Application Brief: Ultra-High Purity Gas Filtration, Electronic Manufacturing; 2011; 1-8; 3M Purification Inc., Meriden, CT USA.
(Continued)

*Primary Examiner* — Frank Lawrence
(74) *Attorney, Agent, or Firm* — Christopher J. Cronin (57) ABSTRACT

Entrained metal hydride particle are removed from a flow of hydrogen from a Mg-based hydride storage unit using not only a particle filter but improvements for reducing or eliminating drastic changes in flow. In addition to or alternative to removal of entrained metal hydride particles, methane produced by reaction of hydrogen with steel in a metal hydride system preferably operated above 350° C. is removed downstream of the Mg-based hydride storage unit using an adsorption cartridge, preferably containing activated carbon.

19 Claims, 9 Drawing Sheets

(52) U.S. Cl.
CPC .. *B01D 2256/16* (2013.01); *B01D 2257/7025* (2013.01); *B01D 2259/4525* (2013.01)

(58) Field of Classification Search
CPC .... B01D 2257/7025; B01D 2259/4525; F17C 11/00; F17C 11/005
USPC ......... 96/121, 134, 152; 206/0.7; 95/96, 143
See application file for complete search history.

(56) References Cited

U.S. PATENT DOCUMENTS

| | | | |
|---|---|---|---|
| 6,261,528 | B1 | 7/2001 | Carrea et al. |
| 6,309,446 | B1 * | 10/2001 | Nakanoya ................ B01J 20/20 502/418 |
| 6,508,866 | B1 | 1/2003 | Golben |
| 6,660,063 | B2 * | 12/2003 | Tom ................... B01D 53/0407 206/0.7 |
| 7,504,083 | B2 | 3/2009 | Congdon |
| 7,736,609 | B1 | 6/2010 | Golben |
| 7,951,225 | B2 * | 5/2011 | Olander ................. F17C 11/00 206/0.7 |
| 8,691,472 | B2 | 4/2014 | Zimmermann |
| 2003/0106429 | A1 * | 6/2003 | Wang ................ B01D 53/0407 95/90 |
| 2006/0054022 | A1 * | 3/2006 | Hosoe ................... B82Y 30/00 96/108 |
| 2010/0261094 | A1 * | 10/2010 | Yu ..................... H01M 8/04201 429/515 |

FOREIGN PATENT DOCUMENTS

| | | |
|---|---|---|
| EP | 0 315 582 | 5/1989 |
| JP | S59-47599 | 3/1984 |
| KR | 100837973 | 6/2008 |

OTHER PUBLICATIONS

Higaki, S., et al.; Emission of Methane from Stainless Steel Surface Investigated by Using Tritium as a Radioactive Tracer; Chemistry Letters, vol. 35, No. 3, 2006, 292-293.

Sakintuna, B., et al.; Metal hydride materials for solid hydrogen storage: A review; International Journal of Hydrogen Energy, vol. 32, issue 9, Jun. 2007, 1121-1140.

Tessier, P., et al.; Decomposition of nickel-doped magnesium hybride prepared by reactive mechanical alloying; Journal of Alloys and Compounds; 302; 2000; 215-217.

* cited by examiner

METHOD OF PURIFYING HYDROGEN FROM A METAL HYDRIDE STORAGE SYSTEM

CROSS-REFERENCE TO RELATED APPLICATIONS

None.

BACKGROUND

Field of the Invention

The present invention relates to the supply of hydrogen from a metal hydride storage system.

Related Art

Current technologies for storage and transport of hydrogen include compressed gas (in steel and composite cylinders and tubes) and liquid. Storage in metal hydrides is attractive when a low operating pressure and restricting the amount of gaseous hydrogen are desired. Metal hydrides that have been used in commercial applications are of the bcc type with a gravimetric capacity below 2% and a high cost which prevents their use for bulk storage applications, considering that this gravimetric capacity is reduced by the pressure vessel required to contain the hydride.

Magnesium hydride is a potentially attractive material for bulk storage with a capacity as high as 7.6 wt %. Magnesium hydride has however suffered from difficult activation and poor kinetics. New synthesis methods have been developed to solve these issues, but they are sophisticated and not industrialized. AU 2005313837 discloses a new alloy of magnesium and nickel having good capacity and which is prepared by casting, thereby rendering it relatively inexpensive and suitable for bulk storage applications.

As with other hydrides, it is possible to use hydrogen storage systems based on this magnesium hydride alloy to deliver hydrogen of higher quality at the point of use than the hydrogen that is used for filling. Since the metal hydride only absorbs hydrogen reversibly, the non-absorbed gas will be concentrated as contaminants in a non-adsorbed form—the residual gas present in the free volume of the hydride bed. When demand for hydrogen from the point of use is initiated and hydrogen is allowed to desorb from the magnesium alloy hydride, the initial flow of hydrogen will be a mixture of desorbed hydrogen and the contaminant-rich gaseous phase. This initial flow of contaminant-rich hydrogen only represents a relatively small amount of the overall gas flow from the storage system throughout the entirety of desorption from the magnesium alloy hydride. Because it represents only a small fraction of the overall hydrogen desorbed from the storage system, if this initial flow exceeds the specifications for contaminant levels required by the point of use, the gaseous hydrogen rich in contaminants is typically discarded (e.g., vented or burned). The venting or burning of a portion of the hydrogen is timed to assure that the hydrogen delivered to the hydrogen user has the required quality with no contaminates. While being a small portion of the total hydrogen desorbed, venting or burning this hydrogen does represent a loss of valuable product.

Two other difficulties remain in using Mg-based hydride systems to deliver hydrogen. One is decrepitation and the resulting formation of loose hydride particles that can be entrained with the flow of hydrogen to the consuming application. The second issue is methane that can result from a reaction of hydrogen with carbon present in steel making up the pressure vessel. The carbon may be incorporated in the steel alloy or a surface contamination resulting from the forming process.

Several hydrogen purification and/or storage solutions have been proposed.

JP 59047599 A2 discloses a storage vessel in which a Ti—Mn hydride (which operates near ambient temperature) is mixed with an adsorbent such as activated carbon. The purpose of the adsorbent is to remove impurities from the hydrogen stream. This proposal does not solve the above-noted problem for the following reason. In comparison to hydride systems not including an adsorbent mixed with the hydride, the storage vessel of JP 59047599 A2 will have a relatively lower gravimetric capacity due to the necessity of mixing the Ti—Mn hydride with the adsorbent. This problem is exacerbated if the adsorbent is also counted upon to remove any methane that is generated within the storage system.

U.S. Pat. No. 7,736,609 discloses a hydrogen purification system in which CO and $CO_2$ are converted to methane by a catalytic reaction. Methane is removed by venting prior to desorption from a hydride material. However, it is evident that some methane will remain in the purified stream at a concentration around hundreds of ppm.

U.S. Pat. No. 6,508,866 discloses a purification system including a mixture of water-absorbing material, metal hydride, and noble metal particles that is intended for removal of water vapor, and other contaminants such as CO, $CO_2$, and $O_2$. This solution does not address the issue of impurities formed by operation of the metal hydride system.

EP0315582 discloses purification by a getter material upstream of purification in a metal hydride purification system. Again this does not address impurities formed by operation of the metal hydride system.

Particle entrainment may be prevented by using a thermoplastic binder, such as disclosed by U.S. Pat. No. 8,691,472. However, this type of solution is not applicable to high-temperature metal hydride systems since the thermoplastic material would flow and not withstand the operating conditions.

U.S. Pat. No. 7,504,083 discloses the use of silica-based gel in the metal hydride storage system. While silica gel should resist high temperature, this addition of silica gel adds weight and reduces the volume available for storage of hydrogen.

KR 100837973 A discloses a powder filter, in the form of a supported mesh, for preventing downstream contamination by particles. The drawbacks of this type of filter are that fine particles can plug the filter, creating a detrimental pressure drop. Any abrupt change in flow can dislodge a portion of the collected particles on the filter and leading to a contamination of the gas stream with entrained particulates.

CN 202048351 discloses a filter sheet similar to the filter of KR 100837973 with similar drawbacks.

SUMMARY

There is disclosed an improved metal hydride-based hydrogen storage and production system comprising a particle removal unit, a means for reducing particle dislodgement from the filter resulting from changes in flow across the filter, and a methane removal unit.

There is also disclosed an improved method for metal hydride-based hydrogen storing and production, comprising the following steps. A flow of hydrogen from a metal hydride-based hydrogen storage unit is allowed. The hydrogen flow is passed through a particle filter and a means for reducing particle dislodgement from the filter resulting from changes in flow across the filter, and a methane removal unit. The hydrogen flow is also passed through an adsorbent adapted and configured to reduce a methane concentration in the hydrogen flow.

The system and/or method may include any one or more following aspects:

- the methane concentration in the hydrogen flow is reduced to less than 0.01 ppm.
- the metal hydride is maintained at a temperature of equal to or more than 350° C.
- the metal hydride is a Mg hydride or a Mg alloy hydride.
- the means for reducing particle dislodgement from the filter resulting from changes in flow across the filter comprises a check valve downstream of the filter.
- the means for reducing particle dislodgement from the filter resulting from changes in flow across the filter comprises one or more modulated flow control valves.
- the storage unit is filled with hydrogen, wherein:
  - during said step of passing the hydrogen flow through a particle filter, the hydrogen flows across said particle filter in a first direction;
  - the means for reducing particle dislodgement from the filter resulting from changes in flow across the filter comprises a by-pass line installed parallel to a portion of a flow path of the hydrogen that including the filter; and
  - during said step of filling the storage unit with hydrogen, said by-pass line receives the hydrogen that is being filled into the storage unit so that there is no flow of hydrogen across the filter in a direction opposite said first direction.
- the storage unit is filled with hydrogen, wherein the means for reducing particle dislodgement from the filter resulting from changes in flow across the filter comprises a filling line that is completely separate from a portion of a flow path of the hydrogen that including the filter so that there is no flow of hydrogen across the filter in a direction opposite said first direction during said step of filling the storage unit with hydrogen.
- the means for reducing particle dislodgement from the filter resulting from changes in flow across the filter comprises a buffer tank installed upstream of the filter in order to dampen any pressure and/or flow shocks that are caused by opening and closing any valves in flow communication with said particle filter.
- the means for reducing particle dislodgement from the filter resulting from changes in flow across the filter comprises a buffer tank installed downstream of the filter in order to dampen any pressure and/or flow shocks that are caused by opening and closing any valves in flow communication with said particle filter.
- the means for reducing particle dislodgement from the filter resulting from changes in flow across the filter comprises a snubber installed upstream of the filter in order to dampen any pressure and/or flow shocks that are caused by opening and closing any valves in flow communication with said particle filter.
- the means for reducing particle dislodgement from the filter resulting from changes in flow across the filter comprises a snubber installed downstream of the filter in order to dampen any pressure and/or flow shocks that are caused by opening and closing any valves in flow communication with said particle filter.
- the means for reducing particle dislodgement from the filter resulting from changes in flow across the filter comprises one or more pressure regulators in order to keep an operating pressure of the filter in a limited range and avoid an undesirably large change in a flow rate of the hydrogen across the filter.
- the means for reducing particle dislodgement from the filter resulting from changes in flow across the filter comprises one or more check valves in order to keep an operating pressure of the filter in a limited range and avoid an undesirably large change in a flow rate of the hydrogen across the filter.
- the methane removal unit includes one or more vessels filled with an adsorbent adapted and configured to adsorb methane.
- the methane removal unit includes one or more vessels filled with an adsorbent adapted and configured to adsorb methane, the adsorbent bed being part of a pressure-swing adsorption (PSA) system.
- the methane removal unit includes one or more vessels filled with an adsorbent adapted and configured to adsorb methane, the adsorbent being activated carbon.
- the flow of hydrogen upstream is cooled upstream of the methane removal unit.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

In a first aspect of the present invention, entrained metal hydride particles are removed from a flow of hydrogen from a metal hydride-based hydrogen storage unit using not only a particle filter but also techniques for reducing or eliminating drastic changes in flow. In a second aspect of the present invention, methane produced by reaction of hydrogen with carbon present in or on steel in a metal hydride system operated above 280° C., preferably above 350° C., is removed downstream of the metal hydride-based hydrogen storage unit using an adsorption cartridge, preferably containing activated carbon. More particularly, the present invention includes a metal hydride-based hydrogen storage unit, a particle removal unit, and a methane removal unit.

Through experimentation with a Mg hydride-based hydrogen storage system, we observed that powder particles can be entrained in the flow of hydrogen despite the presence of powder filters. It is known in the field of gas filtrations that particles larger than the filter pore size will be effectively blocked due to their size, but the retention of particles smaller than the pore size requires pores to be partially blocked by other small particles. Abrupt changes in flow rate and flow direction will lead to particle motion and entrainment.

We also observed the presence of methane in a flow of hydrogen from the Mg hydride-based hydrogen storage system despite the fact that the initial flow of hydrogen having a relative high concentration of impurities had already been purged and despite the fact the hydrogen used to fill the storage system was essentially methane-free. Without being bound by any particular theory, we believe that methane was generated through high temperature reaction with the carbon present in the steel comprising the container for the storage system.

Figure 1:
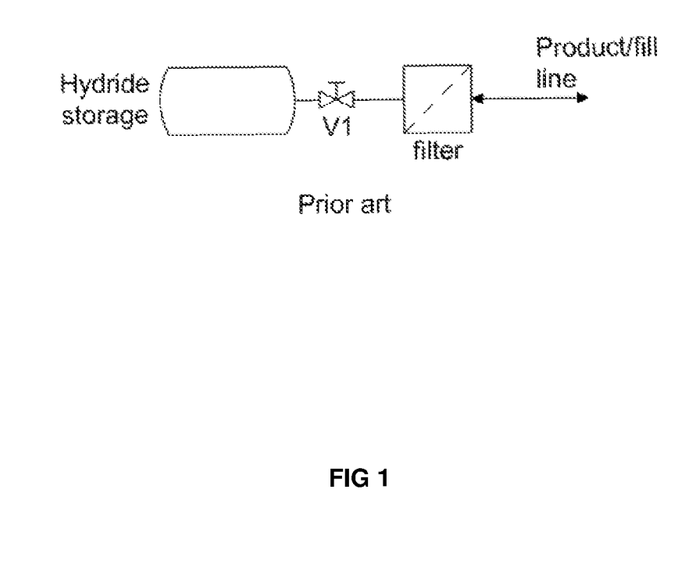
FIG. 1 is a schematic view of a conventional hydride storage device.
Figure 2:
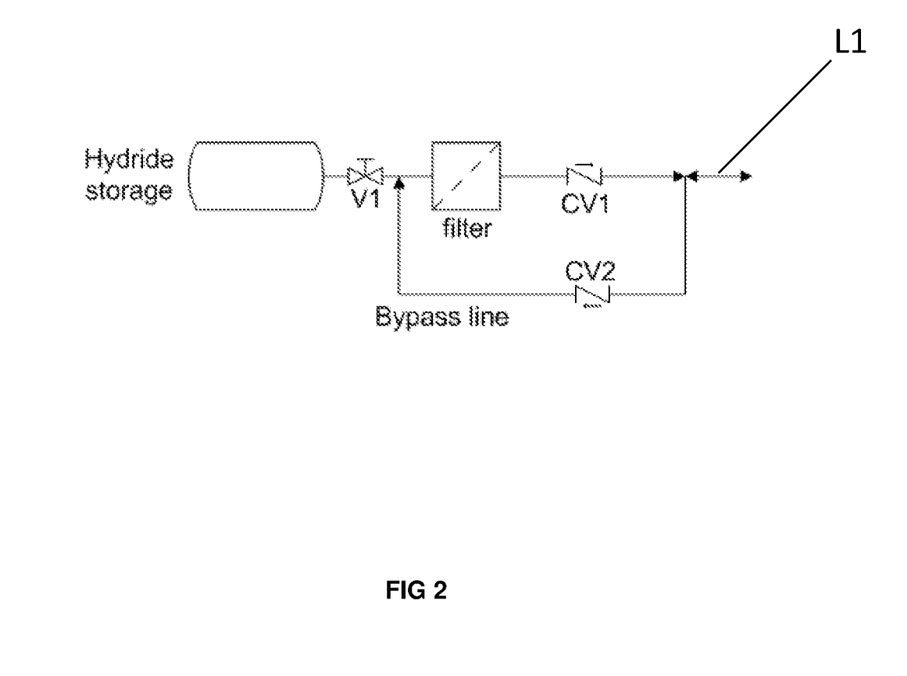
FIG. 2 is a schematic view of an aspect of the invention including a bypass line.

The metal hydride-based hydrogen storage unit stores hydrogen via absorption within the metal hydride and supplies hydrogen by desorption from the metal hydride. The storage unit includes a heat transfer device, well-known in the field of hydride-based hydrogen storage, for heat in and out of the system to ensure sufficient flow of hydrogen during desorption and absorption, respectively. For example, the heat transfer device may be a heat exchanger, or more preferably, a heater. The metal hydrides include any of those known in the field of hydrogen storage and, in particular, Mg alloy hydrides, including those disclosed by AU 2005313837, the contents of which are incorporated by reference. Typically, the metal hydride is maintained at a temperature of at least 350° C. While it is known from U.S. Pat. No. 6,261,528 that such a temperature enables the formation of methane by reaction of hydrogen with steel, operating a Mg or Mg-alloy storage bed at or above this temperature is required in order to provide good desorption kinetics and pressure as shown in FIGS. 1 and 2 of B. Sakintuna, F. Lamari-Darkrim, M. Hirscher, *Metal hydride materials for sold hydrogen storage*: *A review*, International Journal of Hydrogen Energy 32 (2007) 1121-1140. The particle removal unit includes a filter, such as a fabric filter. Any particle filter known in the field of gas handling may be used in the invention that has a particle filtering capability that is designed to satisfy the hydrogen specifications at the point of use. Particular examples include Parker Finite® filters. This type of filter will block most particles down to a specific particle size. The particle removal unit also includes a means for reducing particle dislodgement from the filter resulting from changes in flow across the filter. The means may include one or more techniques selected from the following five techniques.

First, a reversal of flow across the filter is avoided by installing a check valve downstream of the filter. By this, we mean that a change in the direction of hydrogen flow from the Mg hydride-based storage unit across the filter is avoided. In this manner, particles collected in a bed of particles on an upstream face of the filter are not dislodged from the filter. It is well known that filters having a predetermined mesh size may be used for filtration of particles having sizes larger than the predetermined mesh size. Through accumulation of larger-sized particles on the upstream face of the filter, a bed of collected particles forms an effectively smaller mesh size suitable for filtering out particles having sizes smaller than the predetermined mesh size. The mesh size as communicated by a filter manufacturer may not correspond to a physical dimension in the filter, but is used to characterize the filtration performance. Filtration may occur by inertial interception for particulates having an aerodynamic diameter greater than ~1 micrometer and by diffusion for smaller particulates having an aerodynamic diameter <0.2 micrometers.

Second, a by-pass may be installed parallel to the portion of the flow path of the hydrogen including the filter in order to direct a flow of hydrogen into the storage unit (such as during filling of the storage unit) so that a reversal of the flow of hydrogen across the filter may be avoided. The portion of the flow path including the filter and the bypass may be provided with a series of valves so that the direction of the flow may be easily switched.

Third, a completely separate piping for filling the storage unit may be provided so that a reversal of the flow of hydrogen across the filter may be avoided.

Fourth, a flow-regulating device, such as buffer tank or snubber, may be installed upstream and/or downstream the filter in order to dampen the pressure and flow shocks that are caused by opening and closing the various valves. We believe that, when the filter is subjected to a pressure and flow shock, particles smaller than the mesh size of the filter may be dislodged from the collected bed of particles on the filter. Such a dislodgement of particles may cause the collected bed of particles on the filter to no longer filter out particles smaller than the mesh size.

Fifth, one or more pressure-regulating devices such a pressure regulator and/or a check valve may be installed in order to keep the operating pressure of the filter in a limited range and avoid an undesirably large change in the flow rate of gas across the filter.

The methane removal unit includes one or more vessels filled with any adsorbent known in the field of adsorbent-based gas purification for effectively adsorbing methane, including molecular sieve materials, activated carbon, and silica gel. While The adsorbent bed is preferably part of a pressure-swing adsorption (PSA) system, temperature-swing adsorption (TSA) systems are also quite suitable. Activated carbon is preferred. Examples of commercially available activated carbon include Norit RB1 and RB2, Desotec Organosorb 10, and Oxbow Activ'R. Another possibility is a metal-organic framework such as MOF-5 available from BASF. The size of vessels and their operation can be tailored to the Mg hydride-based hydrogen storage unit and its intended use, using techniques known in the field of adsorbent-based gas purification. In the case of a bulk storage system that is typically filled and emptied on a weekly cycle, a single vessel that is regenerated by depressurizing (and also optionally purging with pure hydrogen) before filling again is appropriate. Typically, the methane removal unit lowers the methane concentration in the hydrogen to less than 0.01 ppm.

A single adsorbent bed can be used if it does not require regeneration with pure hydrogen gas until the hydride-based system is filled again before the methane adsorption capacity of said bed is exceeded. Otherwise two or more beds, operating in a cycle comprising successive steps of pure hydrogen production and adsorbent bed regeneration are performed, whereby a portion of the pure hydrogen produced by one bed is used in the regeneration of another bed. Suitable designs of such cycles, based on the pressure, flow, and purity requirements of the hydrogen stream, are well known in the art of adsorbent-based gas purification. The sequence of steps in such a cycle should preferably include:

a production step where contaminated hydrogen flows through the bed, the contaminants are adsorbed and pure hydrogen is produced at the outlet of the bed;

a counter-current depressurization where the bed is isolated from the contaminated hydrogen line (upstream) and the pure hydrogen product line (downstream), and the bed is open to purge line. The decrease in pressure leads to desorption of a large portion of the adsorbed contaminants along with hydrogen contained in the free volume of the bed;

a counter-current purge step where pure hydrogen flows through the bed counter to the direction of flow or the production step, to remove any remaining adsorbed contaminant; and a co-current pressurization where contaminated hydrogen is introduced again in the bed until the operating pressure is reached and the production phases restarts.

Thus, the present invention ensures that a high-capacity metal hydride system provides a highly pure hydrogen stream relatively free of solid particles and methane.

As illustrated in FIG. 1, a prior art hydride-based hydrogen storage system is equipped with a valve V1 to open and close it, and a particle filter. In some ways (such as flow reversal), operation of the filter will dislodge particles trapped in the filter and cause their entrainment in the flow of gas downstream of the filter. This is a well-observed phenomenon in the industrial gas industry. There is no mechanism from stopping a flow with undesirably high levels of methane to the point of use.

As best shown in FIG. 2, flow reversal across the filter is prevented by the addition of two check valves CV1, CV2 and a bypass line to ensure that:

desorbed hydrogen flows through the filter and not through the bypass line;

hydrogen flows through the bypass line (and not through the filter in reverse direction) when the hydride-based storage system is being filled as a result hydrogen only flows in one direction when flowing through the filter.

In detail, V1 opens or closes the hydride-based storage system. Check valve CV1 prevents reverse-flow through the filter during filling but allows forward flow toward the point of use for hydrogen. Check valve CV2 prevents flow of hydrogen through the bypass during desorption but allows flow to go via the bypass during filling of the hydride-based system. Optionally, valve V1 is one that opens and closes gradually, instead of a valve that opens and closes abruptly, therefore limiting sudden changes in flow and pressure. The flow of hydrogen in line L1 may be provided to the point of use or may be provided to the methane removal unit.

During filling hydrogen flows into line L1, through the bypass line and check valve CV2, through valve V1 and into the storage tank. During filling, check valve CV2 is open and check valve CV1 is closed so that hydrogen does not flow across the filter towards the storage tank. During desorption of the hydrogen from the storage tank and production of a flow of hydrogen to the point of use via line L1, valves V1 and check CV1 are open and check valve CV2 is closed so that hydrogen flows across the filter from the storage tank to the point of use via line L1.

Figure 3:
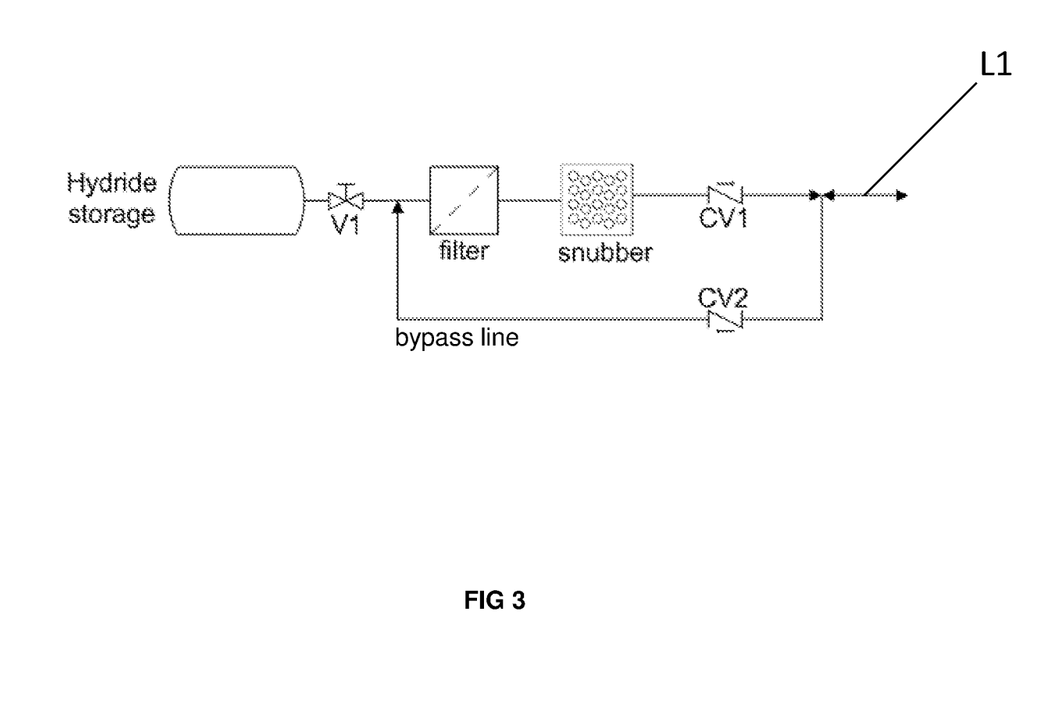
FIG. 3 is a schematic view of an aspect of the invention including a bypass line and a snubber.

The only difference between the embodiment of FIG. 3 and FIG. 2 is the presence of a snubber in the path of the flow of hydrogen (desorbed from the hydride) downstream of the filter in order to dampen abrupt changes of pressure and flow caused for any reason in such a hydrogen supply line. Such reasons include but are not limited to valve opening or valve closing in either the metal hydride storage system or in equipment (i.e., the point of use) utilizing hydrogen downstream of the elements illustrated in FIG. 3. Alternatively, the snubber may be located upstream of the filter. Optionally, and in either alternative, more than one snubber may be used. As in FIG. 2, the flow of hydrogen in line L1 may be provided to the point of use or may be provided to the methane removal unit.

Figure 4:
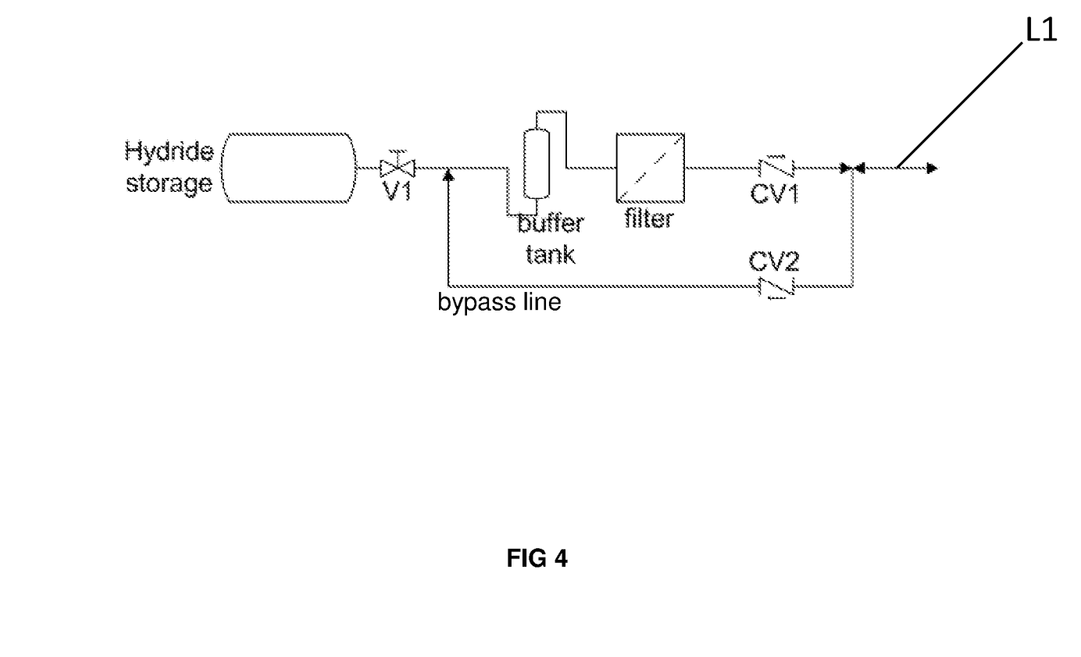
FIG. 4 is a schematic view of an aspect of the invention including a bypass line and a buffer tank.

As best shown in the embodiment of FIG. 4, a buffer may be used as an alternative to the snubber in order to dampen changes of flow and pressure of the flow of hydrogen that may impact the filter. As in FIG. 2, the flow of hydrogen in line L1 may be provided to the point of use or may be provided to the methane removal unit. Otherwise, the filling of the storage tank and desorption and supply of hydrogen is performed as in the embodiment of FIG. 2.

Figure 5:
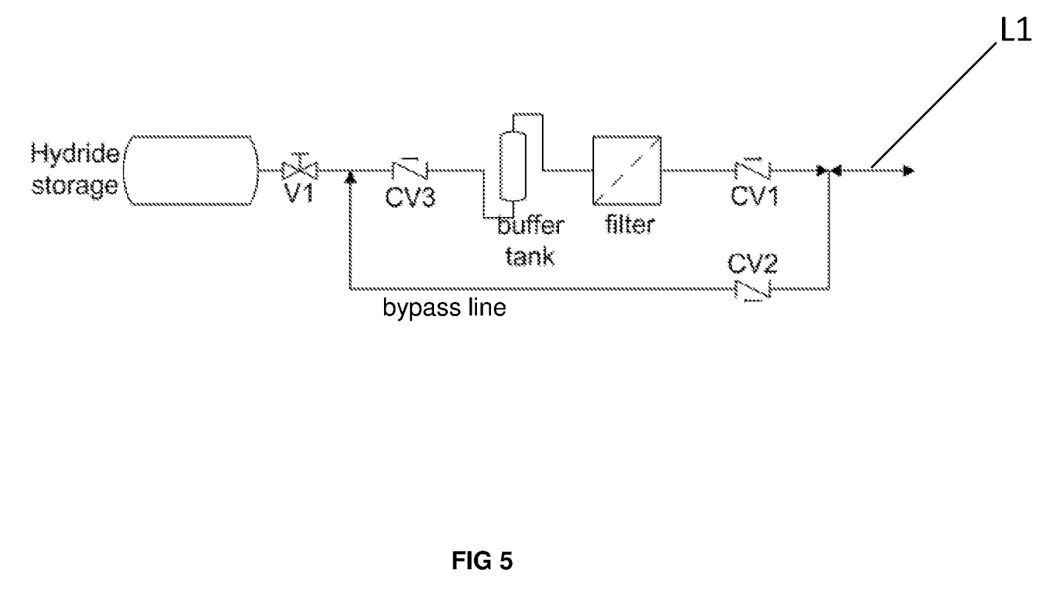
FIG. 5 is a schematic view of an aspect of the invention including a bypass line, a buffer tank, and additional control of the pressure experienced by the filter.

As best illustrated in FIG. 5, a check valve CV1 having a cracking pressure close to the nominal operating pressure (in desorption) of the hydride-based storage system and a check valve CV3 (preferably having a near-zero cracking pressure) are located upstream of the filter but downstream of the most upstream split between the desorption line and the bypass line. This arrangement ensures that the filter is always kept near the nominal pressure of the hydride-based storage system even if the pressure originating from said hydride-based storage to system decreases when it stops operating or when it is filled from a source of hydrogen at a lower pressure than said nominal operating pressure through the bypass line. As in FIG. 2, the flow of hydrogen in line L1 may be provided to the point of use or may be provided to the methane removal unit.

During filling of the storage tank, hydrogen is received by line L1 and flows across valve CV2, the bypass line, and valve V1, and into the storage tank. It is prevented from flowing across the filter by check valves CV1, CV3. During desorption of hydrogen from the storage tank and production of a flow of hydrogen to the point of use, hydrogen flows out of the storage tank across valve V1, check valve CV3, the buffer tank, the particle filter, and check valve CV1. It is received by the point of use via line L1. It is prevented from flowing through the bypass line by check valve CV2.

Figure 7:
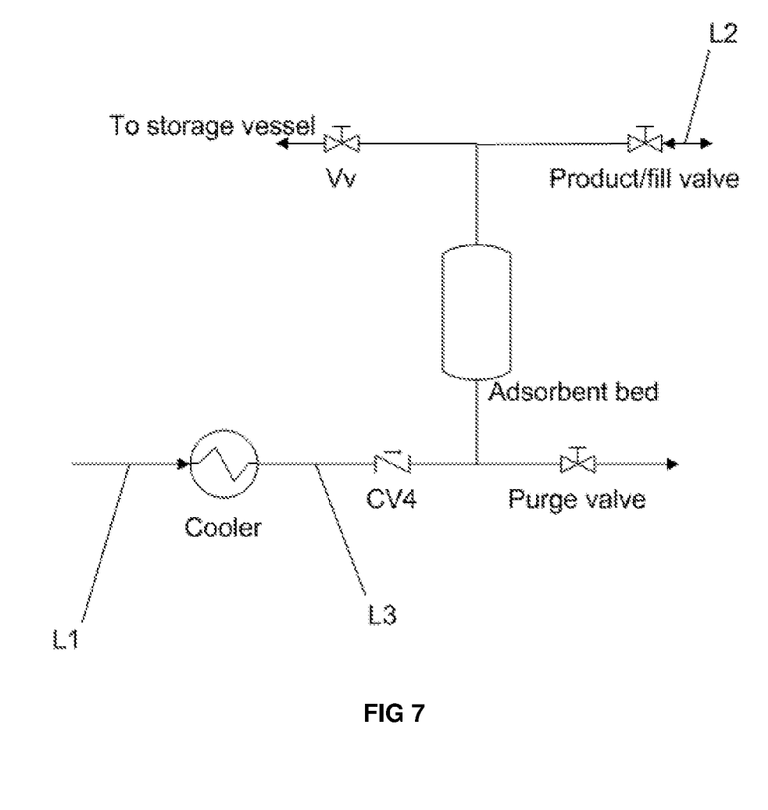
FIG. 7 is a schematic view of an aspect of the invention including an adsorbent bed.
Figure 8:
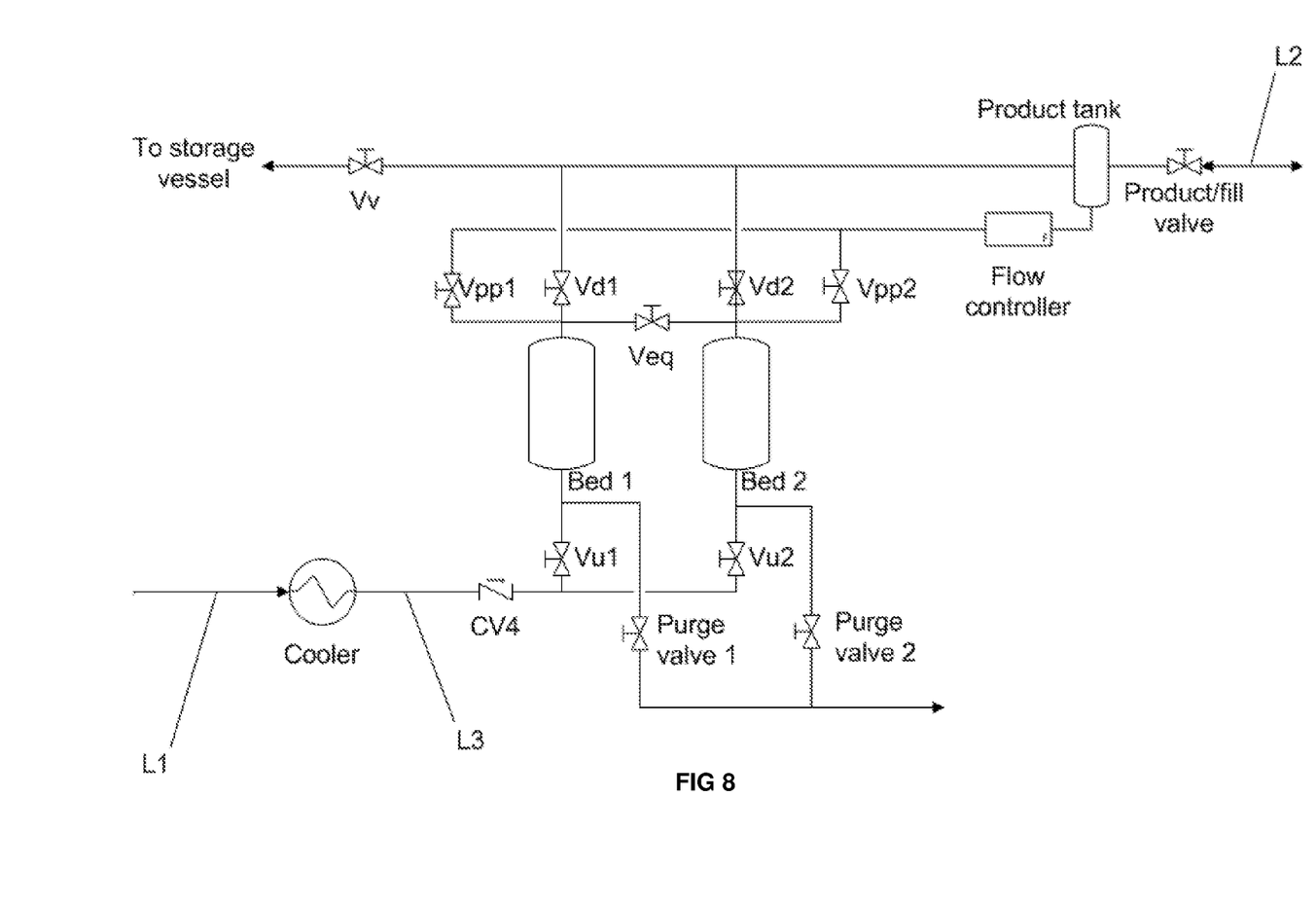
FIG. 8 is a schematic view of an aspect of the invention including a bypass line, a buffer tank, additional control of the pressure experienced by the filter, and two adsorbent beds.

As best shown in FIGS. 7 and 8, a single bed example of PSA and a two-bed example of PSA may be used for the methane removal unit in the present invention.

In the single bed PSA of FIG. 7, the hydride-based storage system is filled by flowing hydrogen via line L3 from a hydrogen source through the product/fill valve and valve Vv (bypassing the adsorbent bed). Typical hydrogen sources include but are not limited to steam methane reformers (SMRs), liquid $H_2$ transfill apparatuses, electrolyzers, $H_2$ pipelines or other hydrogen source known in the field of industrial gases. Line L3 (in each of FIGS. 7-9) receives a flow of hydrogen from line L1 that has been cooled by a cooler disposed downstream of line L1. Line L1 can be any of the previously-described embodiments of FIGS. 2-5 in which the hydrogen flow is treated to remove methane after particle filtering instead of being sent directly to the point of use.

When the storage system is full and desorption starts to supply hydrogen to the point of use (in the same location or after the storage has been transported to another location), contaminated hydrogen flows through CV4, the adsorbent bed where methane is adsorbed, in particular close to the inlet of the bed, and through the product/fill valve where methane concentration is very low. When desorption is stopped or otherwise at any point where the bed needs to be regenerated, the flow of hydrogen is stopped from reaching CV4, the purge valve is open and the bed is depressurized through said purge valve. At the end of this depressurization step, the product/fill valve is open and pure hydrogen (from the source used for filling) is allowed to flow through the product/fill valve, the bed (against the direction of flow of the production step), and the purge valve, removing any remaining adsorbed methane. Then the product/fill valve is closed, the purge valve is closed, and hydrogen is allowed to flow again through CV4 and pressurize the adsorbent bed. Once the adsorbent bed is pressurized, the production step can resume by opening the product/fill valve. For each of FIGS. 7 and 8, the purified hydrogen, now relatively free of particles and methane, flows through line L2 to the point of use.

In the two-bed PSA of FIG. 8, the same exact cycle as in the single-bed system of FIG. 7 can be used, but a portion of the pure hydrogen product from one of the beds can be diverted to the other bed to carry out the counter-current purge step. For example when bed 1 is producing with contaminated hydrogen flowing through CV4, Vu1, bed 1 itself, and emerges through Vd1 with reduced methane concentration and is then directed in most part to the product tank and the product/fill valve, a portion of this hydrogen with reduced methane concentration is directed from the product tank, through a flow controller, Vpp2, bed2, and purge valve 2 to remove any adsorbed methane from the adsorbent material of bed 2. Optionally a pressure equalization step can be added to the cycle by using valve Veq. The flow controller is optional and can be replaced by other flow control equipment such as an orifice.

The PSA system that removes methane typically works near ambient temperature. Since a Mg or Mg allow-based hydride system is operated at elevated temperature, hydrogen desorbed by such system must pass through a cooler, such as a heat exchanger cooled by ambient air before flowing into the PSA or other adsorption-based purification system. As shown in FIGS. 7-8, a cooler is disposed upstream of valve CV4.

The methane removal unit (including a PSA system having one or more adsorbent beds) can alternatively be positioned between the metal hydride storage system and the particle filter system. In this latter arrangement, since a PSA system consists of beds filled with a porous adsorbent, the PSA itself will also act as a particle filter. It can be indeed be used as the particle filter whose preferred mode of operation is described above, in which case a different regeneration procedure without countercurrent flow should be used.

Figure 9:
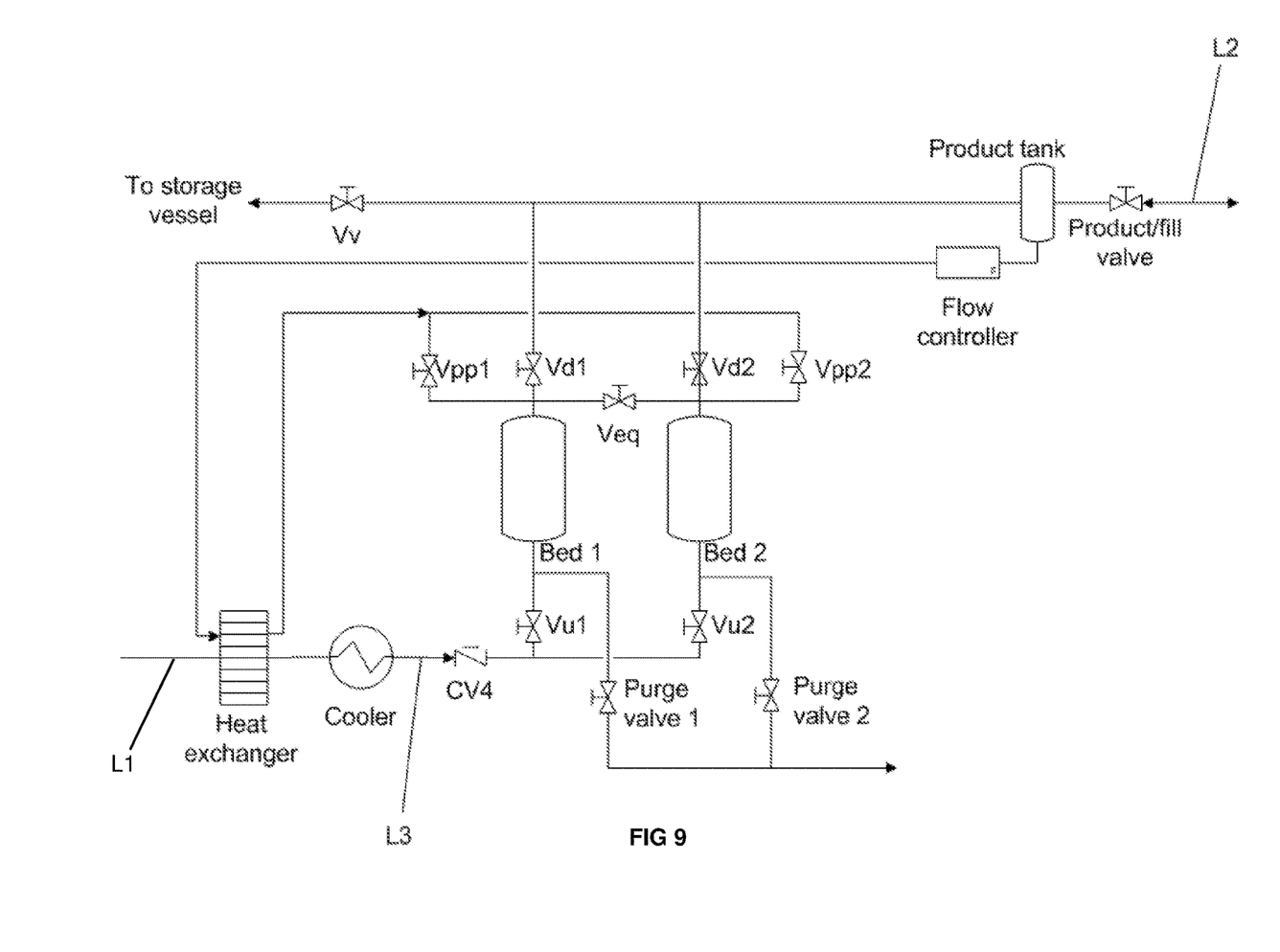
FIG. 9 is a schematic view of a heat-integrated aspect of the invention including a bypass line, a buffer tank, additional control of the pressure experienced by the filter, and two adsorbent beds.

With respect to each of FIGS. 7-9, it should be noted that, during filling, instead of hydrogen flowing directly to the storage tank via valve Vv, the product/fill valve and valve Vv may be placed in fluid communication with any of line L1 in the embodiments of FIGS. 2-5 utilizing a bypass line.

Figure 6:
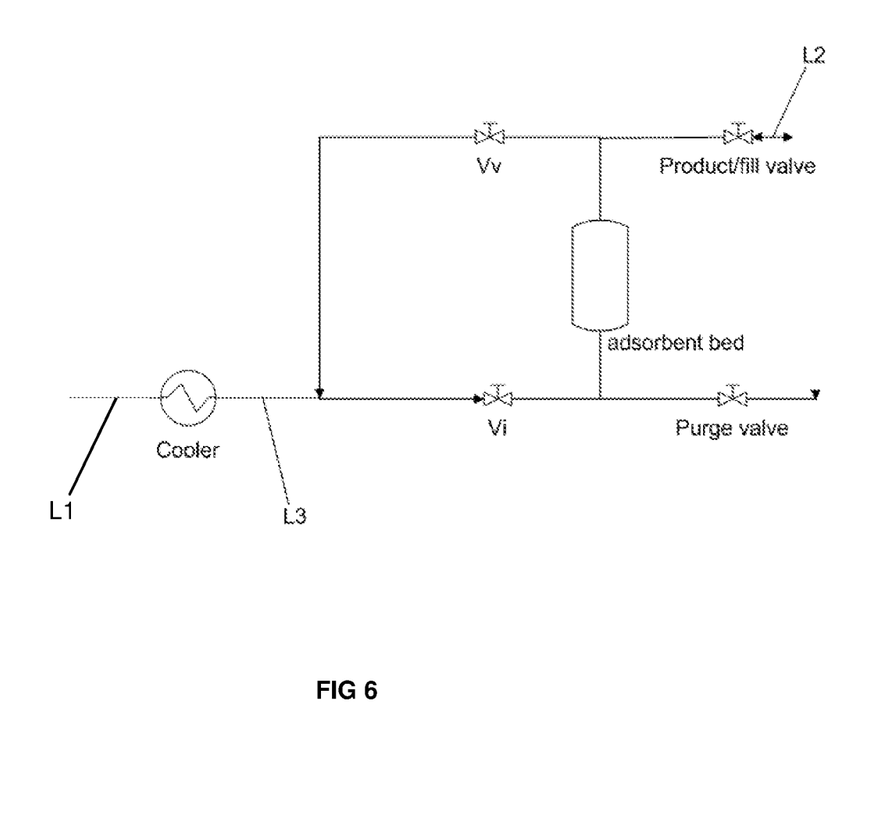
FIG. 6 is a schematic view of an aspect of the invention including an adsorbent bed.

As best shown in FIG. 6 and in a preferred arrangement, a PSA system (including one or more adsorbent beds) may be disposed downstream of any of the schemes of FIGS. 2-5 (including a particle removal unit), and in this case, in between line 1 and line 3. Also, during filling the flow of hydrogen is received across the product/fill valve, into line L3, across the cooler, and into line L1 by virtue of valve Vv being open and valve Vi and the purge valve being closed.

In an alternative approach using equipment similar to the two-bed adsorbent system of FIG. 8, other adsorption processes such as temperature-swing adsorption (TSA) and vacuum-swing adsorption (VSA) are possible in the system of FIG. 9. In a manner known to those of ordinary skill in the art in TSA separations, a TSA process can use heat from a heat exchanger in thermal contact with the hot hydrogen directly desorbed from the metal hydride system. These do not represent a significant departure from the present invention as they simply use a different method of regenerating the adsorbent on a similar set of adsorbent beds.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of purifying hydrogen from a metal hydride-based hydrogen storage system, comprising the steps of:
    allowing a flow of hydrogen from a metal hydride-based hydrogen storage unit, the hydrogen in the storage unit also including methane and particles;
    passing the hydrogen flow through a particle filter;
    passing the hydrogen flow through a means for reducing particle dislodgement from the filter resulting from changes in flow across the filter, said means for reducing particle dislodgement being disposed downstream of said particle filter; and
    passing the hydrogen flow through a methane removal unit comprising one or more adsorbent beds, the methane removal unit being adapted and configured to reduce a methane concentration in the hydrogen flow.

2. The method of claim 1, wherein the methane concentration in the hydrogen flow is reduced to a level less than 0.01 ppm.

3. The method of claim 1, wherein the metal hydride in the metal hydride-based storage unit is maintained at a temperature of equal to or more than 350° C.

4. The method of claim 1, wherein the metal hydride in the metal hydride-based storage unit is a Mg hydride or a Mg alloy hydride.

5. The method of claim 1, wherein the means for reducing particle dislodgement from the filter resulting from changes in flow across the filter comprises a check valve downstream of the filter.

6. The method of claim 1, wherein the means for reducing particle dislodgement from the filter resulting from changes in flow across the filter comprises one or more modulated flow control valves.

7. The method of claim 1, further comprising the step of filling the storage unit with hydrogen, wherein:
during said step of passing the hydrogen flow through a particle filter, the hydrogen flows across said particle filter in a first direction;
the means for reducing particle dislodgement from the filter resulting from changes in flow across the filter comprises a by-pass line installed parallel to a portion of a flow path of the hydrogen that including the filter; and
during said step of filling the storage unit with hydrogen, said by-pass line receives the hydrogen that is being filled into the storage unit so that there is no flow of hydrogen across the filter in a direction opposite said first direction.

8. The method of claim 1, further comprising the step of filling the storage unit with hydrogen, wherein the means for reducing particle dislodgement from the filter resulting from changes in flow across the filter comprises a filling line that is completely separate from a portion of a flow path of the hydrogen that including the filter so that there is no flow of hydrogen across the filter in a direction opposite said first direction during said step of filling the storage unit with hydrogen.

9. The method of claim 1, wherein the means for reducing particle dislodgement from the filter resulting from changes in flow across the filter comprises a buffer tank installed upstream of the filter in order to dampen any pressure and/or flow shocks that are caused by opening and closing any valves in flow communication with said particle filter.

10. The method of claim 1, wherein the means for reducing particle dislodgement from the filter resulting from changes in flow across the filter comprises a buffer tank installed downstream of the filter in order to dampen any pressure and/or flow shocks that are caused by opening and closing any valves in flow communication with said particle filter.

11. The method of claim 1, wherein the means for reducing particle dislodgement from the filter resulting from changes in flow across the filter comprises a snubber installed upstream of the filter in order to dampen any pressure and/or flow shocks that are caused by opening and closing any valves in flow communication with said particle filter.

12. The method of claim 1, wherein the means for reducing particle dislodgement from the filter resulting from changes in flow across the filter comprises a snubber installed downstream of the filter in order to dampen any pressure and/or flow shocks that are caused by opening and closing any valves in flow communication with said particle filter.

13. The method of claim 1, wherein the means for reducing particle dislodgement from the filter resulting from changes in flow across the filter comprises one or more pressure regulators in order to keep an operating pressure of the filter in a limited range and avoid an undesirably large change in a flow rate of the hydrogen across the filter.

14. The method of claim 1, wherein the means for reducing particle dislodgement from the filter resulting from changes in flow across the filter comprises one or more check valves in order to keep an operating pressure of the filter in a limited range and avoid an undesirably large change in a flow rate of the hydrogen across the filter.

15. The method of claim 1, wherein the methane removal unit includes one or more vessels filled with an adsorbent adapted and configured to adsorb methane.

16. The method of claim 15, wherein the adsorbent bed is part of a pressure-swing adsorption (PSA) system.

17. The method of claim 16, wherein the adsorbent is activated carbon.

18. The method of claim 1, further comprising the step of cooling the flow of hydrogen upstream of the methane removal unit.

19. The method of claim 18, wherein said step of cooling is performed with a cooler disposed downstream of the particle filter.

* * * * *